United States Patent [19]

le Méhauté et al.

[11] Patent Number: 4,556,614
[45] Date of Patent: Dec. 3, 1985

[54] METHOD OF PRODUCING A POLYMER BASED SOLID ELECTROLYTE FOR AN ELECTROCHEMICAL CELL

[75] Inventors: Alain le Méhauté, Gif sur Yvette; Thierry Hamaide, Lyons; Gilles Crépy, Evry; Georges Marcellin, Vigneux sur Seine, all of France

[73] Assignee: Compagnie Generale d'Electricite, Paris, France

[21] Appl. No.: 439,003

[22] Filed: Nov. 4, 1982

[30] Foreign Application Priority Data

Nov. 3, 1981 [FR] France ................. 81 20568

[51] Int. Cl.$^4$ ............... H01M 6/16; H01M 6/18; H01M 4/88
[52] U.S. Cl. .................. 429/191; 429/192; 252/182.1; 525/217
[58] Field of Search .................. 429/191–192; 252/182.1; 525/217

[56] References Cited

U.S. PATENT DOCUMENTS

| 4,183,988 | 1/1980 | Farrington et al. | 429/193 |
| 4,230,549 | 10/1980 | d'Agostino et al. | 429/192 X |
| 4,244,988 | 1/1981 | Paruso et al. | 929/193 X |
| 4,357,401 | 11/1982 | Andre et al. | 429/192 |

FOREIGN PATENT DOCUMENTS

| 2442514 | 7/1980 | France | 429/217 |
| 0875629 | 8/1961 | United Kingdom | 429/192 |

*Primary Examiner*—Brian E. Hearn
*Assistant Examiner*—Stephen J. Kalafut
*Attorney, Agent, or Firm*—Sughrue, Mion, Zinn, Macpeak & Seas

[57] ABSTRACT

A method of producing a solid electrolyte for an electrochemical cell, the cell comprising at least one first complexing polymer presenting in its monomer pattern at least one heteroatom and at least one ionizable alkaline salt complexed in the said polymer, wherein said complexing polymer is mixed with at least one second polymer miscible with the said complexing polymer and having cross-linkable functions; said cross-linkable functions then being physically cross-linked, with the complexing polymer being brought to an essentially amorphous state during said cross-linking operation.

The electrolyte obtained can be used in electrochemical cells operating at ambient temperature.

20 Claims, 4 Drawing Figures

METHOD OF PRODUCING A POLYMER BASED SOLID ELECTROLYTE FOR AN ELECTROCHEMICAL CELL

BACKGROUND OF THE INVENTION

This invention relates to a method for producing an electrolyte, comprising, at least one first polymer, called the complexing polymer, having at least one hetero atom in its monomer pattern, together with at least one complexed ionizable alkaline salt in the said polymer.

A number of studies have been conducted on such electrolytes.

French Pat. No. 2 442 513 presents an electrolyte of this type in which the polymer carries, partially or totally, the homo and/or copolymers, essentially non-cross-linked chains, derived from one or several monomers holding a heteroatom capable of forming donor-acceptor type links with the ionizable salt cation.

However, the complex formed has a strong tendency to crystallize at ambient temperature (reduction of the lability between chains), a temperature which is below the melting temperature of the crystallites, which considerably reduces ionic mobility within the network.

The consequence of such a property is a substantial reduction in the ionic conductivity between 100° C. and ambient temperature, a reduction which makes it necessary to use such solid polymer electrolytes above 80° C., because it is necessary to reach the melting temperature of the crystalline zones to obtain enough ionic conductivity, e.g. about $10^{-4}$ (ohm.cm)$^{-1}$.

Also known, i.e. from European patent application No. 0 037 776, is the use of polymers or oligomers, which are cross-linked, in particular chemically, to constitute the complexing polymer, with as low a vitreous temperature as possible.

However, such polymers have proved to have little use as solid electrolytes in electrochemical cells in ambient temperature applications because of their ionic conductivity and because of the instability of the cross-links in the presence of the electrodes, in particular the negative electrode; this is particularly the case for di, tri or multi isocyanate chemical cross-linking in relation to lithium, which reduces them.

The embodiments of the present invention solve the above problems.

SUMMARY OF THE INVENTION

The purpose of the invention is to supply a solid electrolyte which can be used in electrochemical cells operating at ambient temperature. The invention provides a method of producing a solid electrolyte for electrochemical cells, comprising, on the one hand, at least a first polymer, called the complexing polymer, presenting in its monomer pattern at least one heteroatom, and on the other hand, at least one ionizable alkaline salt complexed in the said polymer, characterized by the fact that a mixture is made of the said complexing polymer with at least one additional polymer, miscible with the said complexing polymer, and having cross-linkable functions; then the said cross-linkable functions are cross-linked physically, the complexing polymer being brought to an essentially amorphous state during this cross-linking operation.

The physical cross-linking or reticulation operation can be performed, for example, by irradiation or by hot calendering.

The physical cross-linking avoids introducing, into the polymer mixture, chemical cross-linking functions which are unstable in relation to the materials constituting the electrodes, in particular lithium.

More specifically, the radiation may be ultraviolet, X or gamma radiation, but it may also be particle radiation, e.g. electrons, neutrons or alpha particles.

The hot calendering actuating the cross-linking can be performed from 50° C. upwards.

The complexing polymer used includes one or several heteroatoms, such as oxygen or nitrogen.

The so-called polymer chain can be constituted in the following pattern:

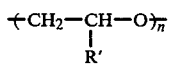

or

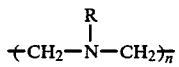

R and R' can be the hydrogen $CH_3$, $(CH_2)_n CH_3$, a polyether chain, for example, a polyoxyethylene chain or a polyoxypropylene chain, or a polysequenced chain of polyethers, or an elastomer chain.

The presence of such chains causes a structural disorder which is favorable to the lowering of the melting temperature of the crystallites which are likely to form within the complexing polymer.

As to the ionizable salt, formula MX, this is not limiting at all, and is the type in which:

$M^+ = Li^+, Na^+, K^+, Ca^{2+}, NH_4^+$.

$X^- = I^-, ClO_4^-, BF_4^-, AsF_6^-, CF_3SO_3^-, CF_3CO_3^-, B_{12}H_{12}^{2-}, B_{10}Cl^{2-}{}_{10}, B\phi_4^-$, $\phi$ designating $C_6H_5$, or an alkyl or an aryl chain.

It is possible to use several ionizable salts together.

Furthermore, it is advantageous that at least one part of the ionizable salt includes an anion so that it will be cross-linked, after radiation, on the second polymer. This anion may be selected from within the group formed by:

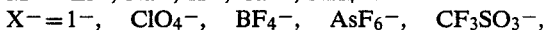
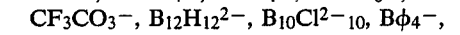

the sulfonate polystyrenes, the polymetacrylates.

These anions create individual barriers to the mobility of the anions which show the crystalization of the complexed polymer, which cannot attain electrical neutrality within the crystalline unit.

The second polymer is advantageously selected from within the group formed by the type acrylic polybutadienenitrile elastomers, methyl polyethyleneacrylate, and the elastomer polyesters.

The second polymer is at a low proportion by weight in relation to the complexing polymer; this proportion could, for example, be from 1 to 25%.

As an illustration one among many, Perbunan could be used as the second polymer at 3.5% by weight, the complexing polymer being preferably formed by a polyoxythylene (PEO) with a molecular weight in the range 5000 to 7,000,000.

In accordance with the invention, the cross-linking can also be done after having introduced a monomer and/or a macromer which could be used as an agent which could be grafted onto the chain/or an agent bridging between chains during the cross-linking. So it is that the following could be used for this purpose: butadiene, light linear ethers, glycol polyethylene, and also, components holding acrylates in their chain, for example methyl acrylate, acrylonitriles, styrenes, for example butadiene-styrene, styrene grafted onto a polydimethyl ether or polyether chain; the chains may be linear or branching. Each of the above-mentioned agents can also be grafted onto an inorganic matrix such as silica, alumina, zircon, glass, etc . . . , in order to modify the structure of any crystallites formed in the complexing polymer. For example, silica powder may be added into the polymer mixture, with a glycol polyethylene already grafted onto the silica powder by known methods.

The second polymer with its cross-linkable functions is provided for several reasons:

1. It creates a structural disorder which controls the miscibility of the polymers in mixture and, therefore, contributes to all the crystallization faults to be encountered later by the stoichiometric complex regulation processes.

2. It can play a surface active role in relation to any crystallites formed, and, therefore, contribute to their dispersal as well as contributing to limiting their size. This would be the case during copolymerizing under radiation of acrylic components (lyophiles) and of macromers containing a complexing oligomer chain.

3. It creates a local micro network capable of imprisoning the amorphous and conductive form of the complexing chain and of keeping it without recrystallizing.

4. We also found that in certain cases the second polymer could present complexing properties in relation to the ionizable salt, for example, when it held polydimethyl ethers (polyglymes).

The irradiation can be performed on a membrane, in the solid state or on a gel holding the polymer mixture and the electrolytic ionizable salt.

Less than 10% by weight phthalocyanines of lithium or of lutetium and also porphins, porphyrins, or generally speaking, sands may also be added into the irradiated mixture in order to improve the conductivity of the electrolyte and, under certain circumstances, to modify its color.

Cross-linking under radiation may be performed on the heated mixture until melting temperature in the crystalline ranges, with the complexing polymer brought to an essentially amorphous state characterized by its melting within most of the above-mentioned ranges. It is then cooled to ambient temperature.

In this case, the amorphous form is fixed at ambient temperature, thus keeping all the texture properties which are desired to obtain a good conductivity at ambient temperature. It should be noted that the bringing to the proper temperature, which then only requires simply exceeding the vitreous transition or melting temperature of the majority of the crystallites, can be done under infrared or ultraviolet radiation.

The cross-linking under radiation can be performed on the polymer mixture, as defined above, with an added active mass, the weight ratio between the polymer masses and a salt on the one hand, and the active mass on the other hand, being from 0.001 to 10.

In this way a composite solid electrode-electrolyte unit may be produced.

Among a number of possibilities, in the case of a positive electrode, the active mass can include $TiS_2$, with $Li_x$ $FeS_2$ with $0<x\leq 2$, $NiPS_3$, $V_6O_{13}$, $WO_3$, $MoO_3$, $V_2O_5$, $MnO_2$, mixtures of $PbO_2$ and $Bi_2O_3$, as well as fluorocarbon polymers, polyacetylenes, or polypyrroles.

In the case of a negative electrode, the active mass can include metal alloys, type LiAl, LiB, LiMg and non stoichiometric compounds derived therefrom.

The polymer mixture may be impregnated with a solid inorganic electrolyte such as beta aluminium or $Li_3N$, for example.

BRIEF DESCRIPTION OF THE DRAWING

The performances of numerous examples are plotted in graph form in FIGS. 1 to 4 of the accompanying drawing.

DETAILED DESCRIPTION OF THE INVENTION

The following paragraphs, give some examples of making solid electrolytes and solid batteries in accordance with the invention.

EXAMPLE 1

(Prior Art)

700 mg of polyoxyethylene (POE) whose molar weight is $4\times 10^6$, 300 mg of $LiClO_4$ and 50 mg of phthalocyanine of lithium are inserted into 40 $cm^3$ of acetonitrile.

This mixture is then poured into a mold and evaporated in a glove box for 15 days to remove the acetonitrile.

The electrolyte membrane obtained in this way is heated to 100° C. for one hour, then irradiated (one hour under X-rays). The irradiated membrane is installed in an electrochemical cell whose negative electrode holds lithium and whose positive electrode holds $NiPS_3$. The positive active mass $NiPS_3$ is supplemented with 50% (by weight) of the preceeding solid electrolyte, nonirradiated, in order to ensure its ionic conductivity.

Five hours after the installation, this cell cannot be discharged at ambient temperature. On the other hand, it can be discharged beginning at 80° C.; we obtain an efficiency of 100% at 30 MA at 80° C. The return to ambient temperature preserves the discharge possibilities obtained at 80° C. for five hours at most.

Figure 1:
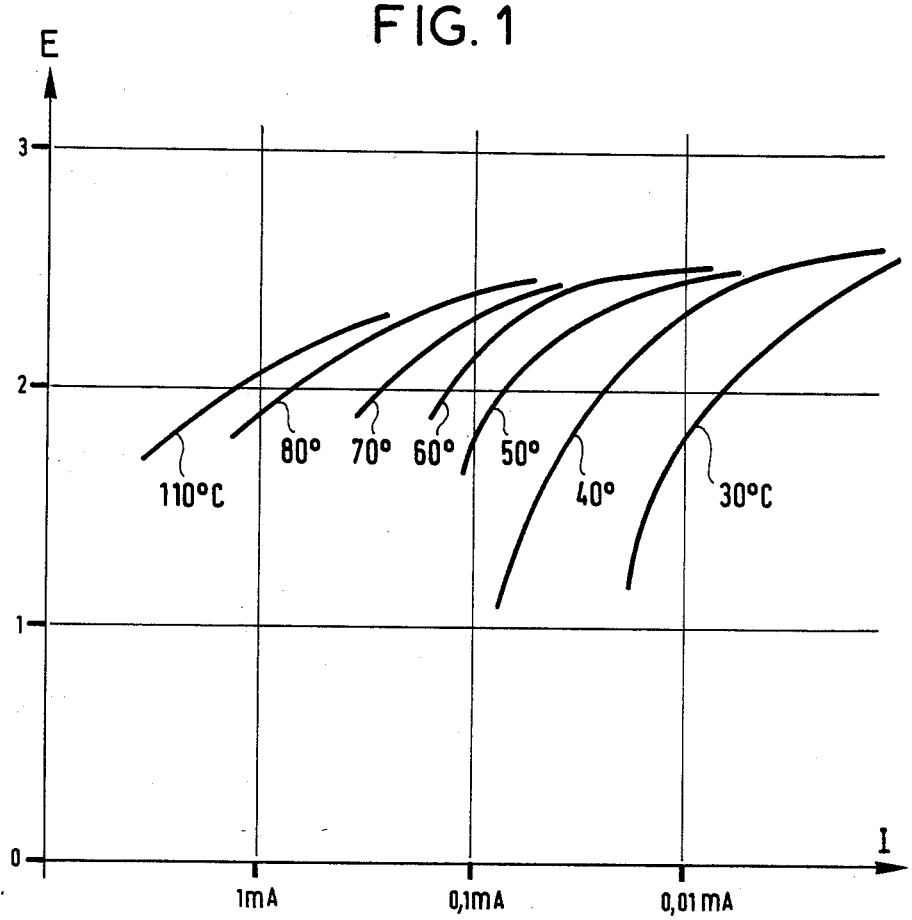

FIG. 1 gives the initial voltage characteristics (E) in volts, current I in milliamperes, after this five hour storage time, of such a generator for various temperatures. The resistivity of the electrolyte at ambient temperature is higher than $10^7$ ohm.cm.

EXAMPLE 2

Polyoxyethylene (PEO), molecular weight $4\times 10^6$ is used as a complexing polymer.

The ionizable salt is $LiClO_4$.

The proportion of ionizable salt to the complexing polymer is such that one atom of Li corresponds to eight atoms of oxygen coming from the POE.

The second polymer is made up of acrylic polybutadiene-nitrile, more specifically Perbunan, reference 3807 NS 71 24 77/10 supplied by SAFIC ALCAN.

The weight proportion of the second polymer in relation to the complexing polymer is close to 3.5%.

The mixture of the polymers and of the ionizable salt is placed in solution in the acetonitrile.

The solution is then poured on a plane surface and the solvent is evaporated using argon.

In this way a membrane of about 120 cm$^2$ is made with a thickness close to 0.2 mm.

After drying, the membrane is heated to about 100° C. and then irradiated with X-rays emitted by a chromium anti-cathode, the irradiation takes place over the complete spectrum for 15 minutes.

Next, the electrolytic membrane is installed in a button cell, 20 mm in diameter and 2 mm thick, having a lithium negative electrode and a positive electrode based on a mixture including 50% NiPS$_3$ and 50% POE and LiClO$_4$, not irradiated.

All these components are placed into contact under a tension of 2.5 Kg using a spiral spring.

At various current densities, weak pulse discharges are regularly actuated. The discharge periods are scheduled between one hour and several weeks and the conservation of the performance of the cell in storage is examined.

Any recrystallizing of the complexing polymer causes lower pulsed discharge performance.

Figure 2:
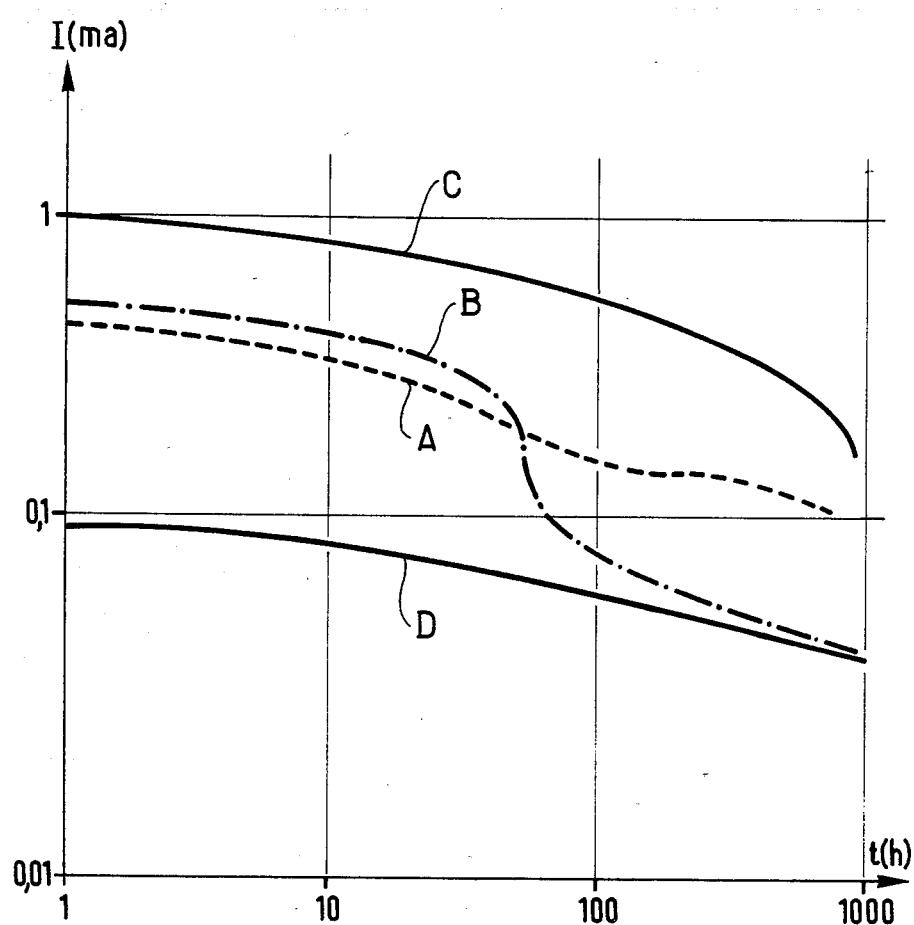

The current I, in mA is plotted along the y axis, for an overvoltage of 1.5 V, as a function of storage time t, in hours, plotted along the x axis. The cell discharge depth is weak in every case. Curve (A) in FIG. 2 is obtained.

EXAMPLE 3

Same operating conditions as in Example 2—but without irradiation. Curve (B) in FIG. 2 is obtained.

EXAMPLE 4

Same operating conditions as in Example 2—but the ionizable salt LiClO is replaced by LiCF$_3$SO$_3$. Curve (C) in FIG. 2 is obtained.

EXAMPLE 5

Same operating conditions as in Example 4, but without irradiation. Curve (D) in FIG. 2 is obtained.

These curves (A), (B), (C), (D) show:

in the case of exemple 3, recrystallization occurs after about 80 hours of storage at ambient temperature.

in the case of example 5, recrystallization occurs in less than one hour, in the case of examples 2 and 5, corresponding to the use of the invention, performance evolves very slowly without recrystallization before 1000 hours.

EXAMPLE 6

The starting mixture comprises:
(POE), molecular weight 4 000 000
LiClO$_4$ in the same proportions as in example 2
a macromer, that is, styrene grafted onto a polyglymous chain having 12 chain links $+CH_2-CH_2-O+$, designated by SOE$_{550}$.

The proportion of SOE$_{550}$ in weight in relation to (POE) is 20%.

Figure 3:
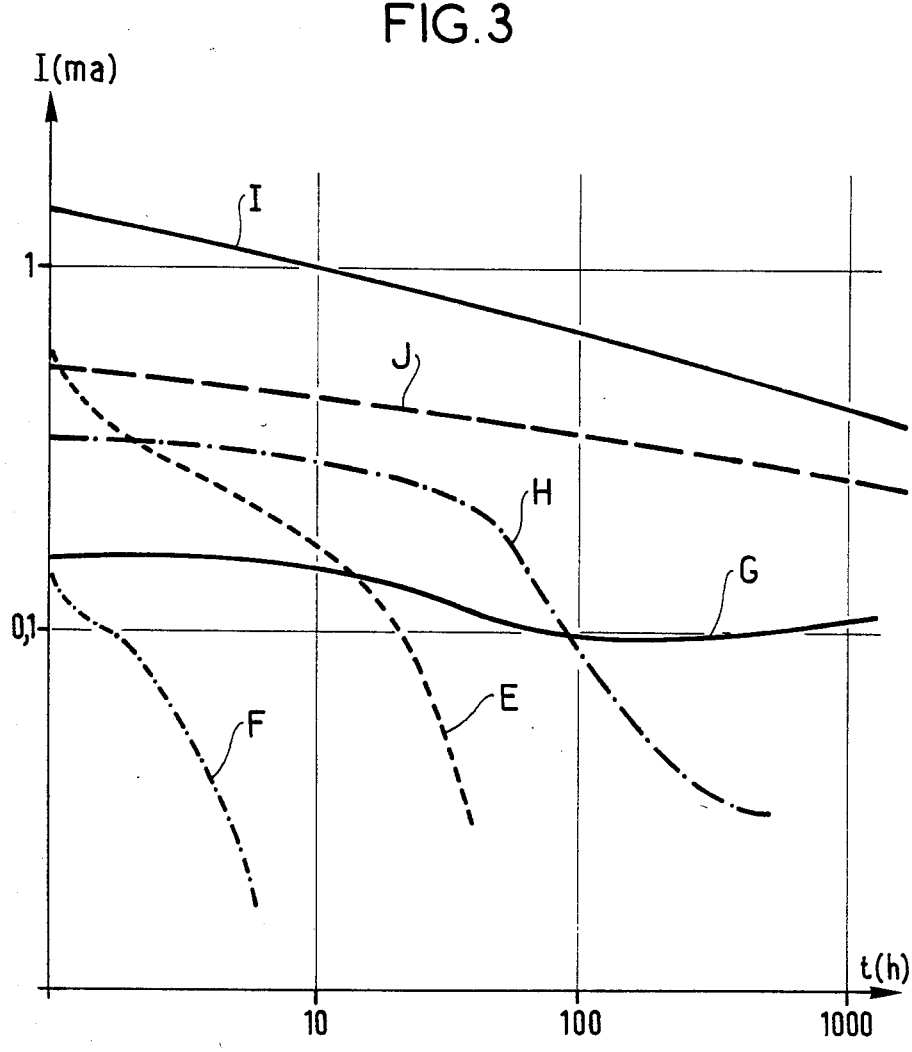

The conditions for building the membrane and placing it in the generator are the same as in example 2. Curve (E) in FIG. 3 is obtained.

And so we note that the presence of a single macromer is not enough to substantially delay recrystallization.

EXAMPLE 7

Same operating conditions as in example 6, but without irradiation. Curve (F) in FIG. 3 is obtained. The results are considerably worse than in the preceding example.

EXAMPLE 8

Same operating conditions as in example 6, 3.6% by weight Perbunan is added to the mixture. Curve (G) in FIG. 3 is obtained.

EXAMPLE 8'

Same operating conditions as in example 8, but the proportion of SOE550 is 5% and not 20%. The recrystallizing time is then about a hundred hours.

EXAMPLE 9

Same operating conditions as in example 7, but 3.6% of Perbunan is added. Curve (H) in FIG. 3 is obtained.

EXAMPLE 10

Same operating conditions as in example 8, but the ionizable salt is made up of LiCF$_3$SO$_3$. Curve (I) in FIG. 3 is obtained.

Observe that the curves corresponding to the mixtures which are not irradiated or do not contain the second polymer tend to quickly recrystallize.

EXAMPLE 10'

Same operating conditions as in example 10, (POE, LiCF$_3$SO$_3$, SOE$_{550}$—20% in weight in relation to POE, Perbunan —3.5% in weight in relation to POE), but the cross-linking is obtained by hot calendering (0.1 mm at 60° C.) without irradiation. The same results are obtained as in the case in example 10.

EXAMPLE 11

Same operating conditions as in example 10, but the Perbunan content goes from 3.5% to 10%. Curve (J) in FIG. 3 is obtained. The performance is weaker than in curve (I) but the recrystallization is blocked in the same way as in example 10.

EXAMPLE 12

Same operating conditions as in example 8, but only 5% of SEO$_{550}$ is used. Recrystallization takes place after about one hundred hours.

EXAMPLE 13

Same conditions as in example 10 but the SEO$_{550}$ is replaced by SEO$_{5000}$—113 chain links $+O+CH_2-CH_2-$ on a styrene link. The results are identical to those in example 10.

EXAMPLE 14

Same operating conditions as in example 2, a bridging agent made up of a bi styrenic linear polyether at the ends, known under the reference (V$_2$PE)$_{6800}$ is also incorporated in the polymer mixture.

Figure 4:
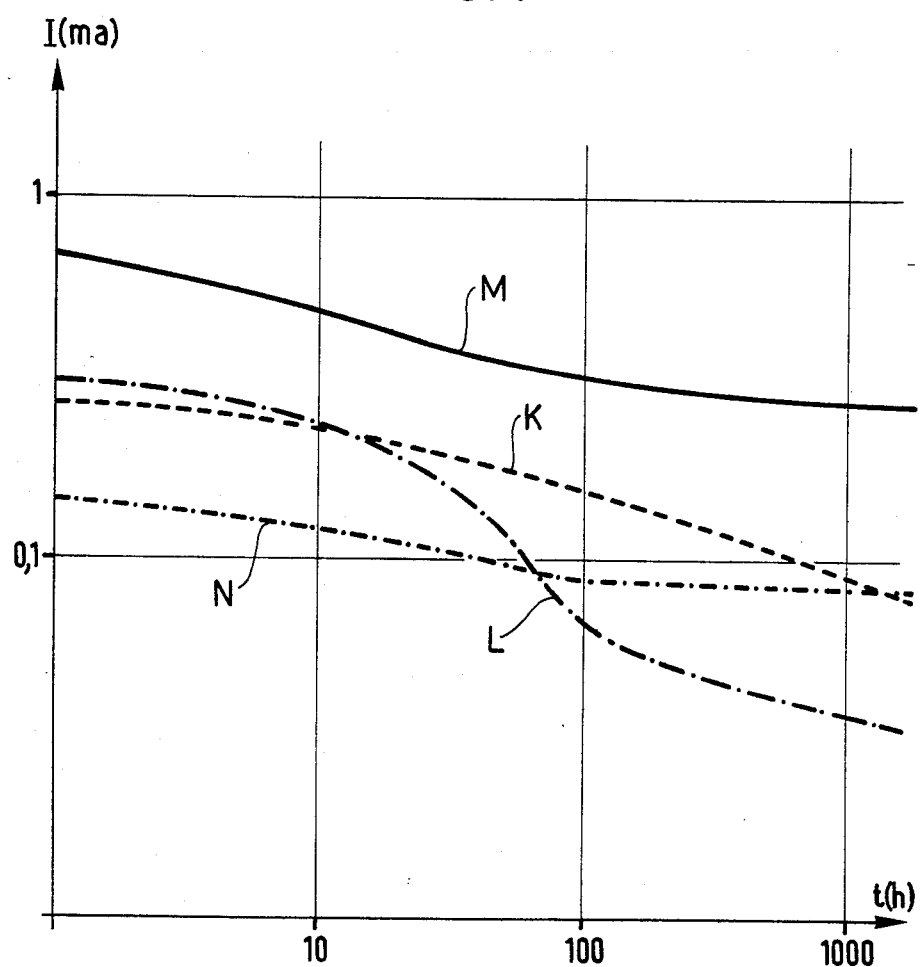

The weight proportion of this agent in relation to the PEO is 20%. Curve (K) in FIG. 4 is obtained.

EXAMPLE 15

Same operating conditions as in example 14, but without irradiation. Curve (L) in FIG. 4 is obtained.

EXAMPLE 16

Same operating conditions as in example 14, but the $LiClO_4$ is replaced by $LiCF_3SO_3$. Curve (M) in FIG. 4 is obtained.

EXAMPLE 17

Same conditions as in example 16, but without irradiation. Curve (N) in FIG. 4 is obtained.

EXAMPLE 18

Same operating conditions as in example 2, but lutetium phthalocyanine is also incorporated in the polymer mixture. Also, the membrane is installed between a lithium electrode and a counter electrode constituted by a tin oxide type electronic conductor. The polymer then has the property of changing color under electric voltage.

EXAMPLE 19

20% by weight sodium second beta alumina is incorporated in the mixture described in example 2. The average performance obtained is 100 μA on the cells and no recrystallizing is observed after 1000 hours.

EXAMPLE 20

20% by weight of a silica is added to the mixture described in example 2, chemically grafted, according to a known method. Polydimethyl ether complexing chain links made up of oligomers of 10 to 200 chain links —O—$CH_2$—$CH_2$—, are chemically grafted by a known method to the silica before it is added to the mixture. The results obtained are identical with the results obtained in example 8.

EXAMPLE 21

Same operating conditions as in example 2, but the ionizable salt includes, by weight:
90% $LiClO_4$
10% $CF_3CF_2COOLi$
The same results are obtained as in example 4.

EXAMPLE 22

Same operating conditions as in example 21, but $CF_3CF_2COOLi$ is replaced by $CH_2=CH-(CH_2)_3-SO_3Li$. The same results are obtained as in example 10.

We claim:

1. A method of producing a solid electrolyte for an electrochemical cell, comprising mixing at least one first complexing polymer having in its monomer pattern at least one hetero atom and having at least one ionizable alkaline salt complexed therein with at least one second polymer miscible with the said complexing polymer and having cross-linkable functions and said second polymer being selected from the group consisting of acrylic polybutadiene nitrile elastomers, methyl polyethylene acrylate elasters, elastomer polyesters and polyglymous polymers grafted onto styrene, then physically cross-linking said cross-linkable functions while bringing the complexing polymer to an essentially amorphous state during said physical cross-linking.

2. A method according to claim 1, wherein the cross-linking is performed by irradiation.

3. A method according to claim 1, wherein the cross-linking is performed by hot calendering.

4. A method according to claim 1, wherein the complexing polymer is brought to an essentially amorphous state by heating at a temperature close to 100° C.

5. A method according to claim 1, wherein said heteroatom in said complexing polymer is chosen from O and N.

6. A method according to claim 5, wherein the complexing polymer chain is formed in the following pattern:

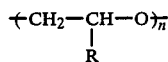

or in the following pattern:

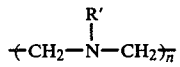

where R and R' are chosen from the group consisting of: hydrogen; the e.g. a polyoxyethylene or polyoxypropylene chain, or a and an elastomer chain.

7. A method according to claim 1, wherein the ionizable salt cation is selected from the group consisting of $Li^+$, $Na^+$, $K^+$, $Ca^{2+}$ and $NH_4^+$, the salt anion being chosen from the group consisting of $I^-$, $ClO_4^-$, $BF_4^-$, $AsF_6^-$, $CF_3SO_3^-$, $CF_3CO_3^-$, $B_{12}H_{12}^{2-}$, $B_{10}Cl_{10}^{2-}$, $CF_3CF_2COO^-$, $CF_3(CF_2)_6CF_2SO_3^-$, $CH_3(CH_2)_5CH_2SO_3^-$, $CH_2=CH-(CH_2)_3-SO_3^-$, the sulfonate polystyrenes, the polymetacrylates and $B\phi_4^-$, where $\phi$ designates $C_6H_5$, or an alkyl chain, or an aryl chain.

8. A method according to claim 1, wherein the proportion by weight of the second polymer in relation to the complexing polymer lies in the range 1 to 25%.

9. A method according to claim 1, wherein at least one of a monomer and macromer component is introduced into the mixture before cross-linking, said component being capable of acting as at least one of an agent which can be grafted onto a chain of the first complexing polymer and an agent which can bridge chains of the first complexing polymer during cross-linking.

10. A method according to claim 9, wherein said component is chosen from the group consisting of butadiene, light linear ethers, glycol polyethylene, compounds including acrylate in their chains and acrylonitriles, styrenes.

11. A method according to claim 9, wherein said component is grafted onto a mineral matrix.

12. A method according to claim 1, wherein a component selected from the group consisting of lithium or lutetium phthalocyanines, porphins, porphyrins, and sands is inserted into the polymer mixture before crosslinking, in a proportion of not more than 10% by weight.

13. A method according to claim 1, wherein a solid mineral electrolyte is inserted into the polymer mixture before irradiation.

14. A method according to claim 1 wherein an active electrode mass is inserted into the polymer mixture, before irradiation, with a weight ratio between the polymer and salt, and between the polymer and said active mass, lying in the range of 0.001 to 10, whereby an electrolyte-electrode unit is produced.

15. A method according to claim 14, wherein said active mass is selected from the group consisting of $TiS_2$, $S$, $Li_xFeS_2$, with $0<x\leq 2$, $NiPS_2$, $V_6O_{13}$, $WO_3$, $MoO_3$, $V_2O_5$, $MnO_2$, mixtures of $PbO_2$ and $Bi_2O_3$, fluoro-carbon polymers, polyacetylenes and polypyrroles.

16. A method according to claim 14, wherein said active mass is selected from the group consisting of metal alloys, and type LiAl, Lib, LiMg and non-stoechiometric compounds derived therefrom.

17. The method of claim 6 wherein the polyether chain is selected from the group consisting of a polyoxyethylene chain, a polyoxypropylene chain and a polysequenced chain of polyethers.

18. The method of claim 10 wherein the styrene is a butadiene stryene or strene grafted onto a polyglymous or polyether chain, said chain being linear or branched.

19. The method of claim 11 wherein the mineral matrix is silica, zircon, alumina or glass.

20. The method of claim 12 wherein the solid mineral electrolyte is beta alumina or lithium nitride.

* * * * *